(12) United States Patent
Eichenauer et al.

(10) Patent No.: US 6,774,166 B1
(45) Date of Patent: Aug. 10, 2004

(54) THERMOPLASTIC MOLDING COMPOUNDS

(75) Inventors: Herbert Eichenauer, Dormagen (DE); Edgar Leitz, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 186 days.

(21) Appl. No.: 10/009,245

(22) PCT Filed: May 30, 2000

(86) PCT No.: PCT/EP00/04937

§ 371 (c)(1),
(2), (4) Date: Dec. 7, 2001

(87) PCT Pub. No.: WO00/77092

PCT Pub. Date: Dec. 21, 2000

(30) Foreign Application Priority Data

Jun. 11, 1999 (DE) .......................... 199 26 622

(51) Int. Cl.$^7$ ................................. C08K 5/20
(52) U.S. Cl. ...................... 524/232; 524/231; 524/394; 524/504; 525/64; 525/233; 525/316
(58) Field of Search ................................. 524/232, 231, 524/504, 394; 525/316, 64, 233

(56) References Cited

U.S. PATENT DOCUMENTS

| 4,070,327 | A | * | 1/1978 | Junger et al. | ................ | 524/292 |
| 4,248,778 | A | | 2/1981 | Arnold et al. | ............. | 260/23.7 |
| 4,526,927 | A | * | 7/1985 | Hambrecht et al. | ........... | 525/68 |
| 4,742,116 | A | * | 5/1988 | Schepers et al. | .............. | 525/74 |
| 5,210,135 | A | | 5/1993 | Eichenauer et al. | .......... | 525/71 |
| 5,321,078 | A | * | 6/1994 | Mashita et al. | ................ | 525/64 |
| 5,658,985 | A | | 8/1997 | Eichenauer et al. | .......... | 525/83 |
| 6,090,889 | A | * | 7/2000 | De Loor et al. | .............. | 525/94 |

FOREIGN PATENT DOCUMENTS

| EP | 626 375 | 11/1994 |
| EP | 626 376 | 11/1994 |
| EP | 869147 | * 10/1998 |
| WO | 98/43965 | 10/1998 |

* cited by examiner

Primary Examiner—David W. Wu
Assistant Examiner—Henry Hu
(74) Attorney, Agent, or Firm—Joseph C. Gil; James R. Franks; Aron Preis

(57) ABSTRACT

A thermoplastic molding composition that features a combination of good notched impact strength and thermoplastic processability is disclosed. The composition contains one or more thermoplastic (co)polymers, a graft polymer and a combination of at least 3 components chosen from a compound (I) having at least one structural unit conforming to

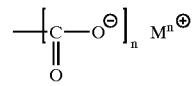

where M=a metal, and n=the valence of the metal M, and a compound (II) having at least one structural unit conforming to

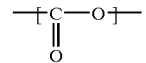

and a compound (III) having at least one structural unit conforming to

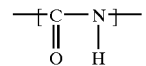

and a compound (IV) that contains none of the structural units of (I), (II) and (III).

14 Claims, No Drawings

THERMOPLASTIC MOLDING COMPOUNDS

ABS moulding compositions have already been employed in large amounts for many years as thermoplastic resins for the production of all types of mouldings. The spectrum of properties of these resins here ranges from relatively brittle to very tough.

A specific field of use of ABS moulding compositions is the production of mouldings by injection moulding (e.g. housings, toys, motor vehicle components), where very good flowability of the polymer material is particularly important. In addition, the mouldings produced in this way must as a rule have a good notched impact strength.

There is the object of achieving the highest possible toughness values at a given rubber content, given rubber particle size and given matrix resin molecular weight, while retaining the good thermoplastic flowability. The high toughness values should be obtained here as far as possible independently of the type of matrix resin employed, especially when the styrene/acrylonitrile copolymers and α-methylstyrene/acrylonitrile copolymers typical of ABS are used.

One possibility of increasing the toughness of ABS polymers at a given rubber content, given rubber particle size and given matrix molecular weight is the addition of special silicone oil compounds (cf. EP-A 6521); however, disadvantages such as poor paintability, inadequate printability or impaired yield stress values (risk of white fracture) may occur here. The addition of small amounts of EPDM rubber (cf. EP-A 412 370) or AES polymer (cf. EP-A 412 371) has also been described. However, both methods require relatively expensive additive components employed in considerable amounts.

It has now been found that by employing special additive mixtures, ABS products with a very good combination of notched impact strength (both at room temperature and at a low temperature) and thermoplastic processability are obtained.

The invention relates to thermoplastic moulding compositions comprising

A) 5 to 95 wt. %, preferably 10 to 90 wt. %, and particularly preferably 20 to 75 wt. % of one or more thermoplastic homo-, co- or terpolymers of styrene, α-methylstyrene, styrene substituted on the nucleus, methyl methacrylate, acrylonitrile, methacrylonitrile, maleic anhydride, N-substituted maleimide or mixtures thereof B) 5 to 95 wt. %, preferably 10 to 90 wt. %, and particularly preferably 25 to 80 wt. % of one or more graft polymers of
  B.1) 5 to 90 parts by wt., preferably 20 to 80 parts by wt., and particularly preferably 25 to 60 parts by wt. styrene, α-methylstyrene, styrene substituted on the nucleus, methyl methacrylate, acrylonitrile, methacrylonitrile, maleic anhydride, N-substituted maleimide or mixtures thereof on
  B.2) 95 to 10 parts by wt., preferably 80 to 20 parts by wt., and particularly preferably 75 to 40 parts by wt. of at least one rubber with a glass transition temperature of $\leq 10°$ C.
and
C) 0.1 to 8 parts by wt., preferably 0.5 to 6 parts by wt., and particularly preferably 1 to 5 parts by wt., in each case per 100 parts by wt. of A)+B), of a combination of at least 3 components chosen from compounds I), II), III) and IV), where I) represents a compound with at least one structural unit

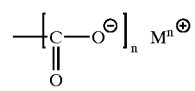

where
M=a metal, preferably Mg, Ca, Zn
n=the valency of the metal M, preferably 1 or 2,
II) represents a compound with at least one structural unit

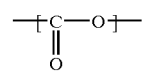

III) represents a compound with at least one structural unit

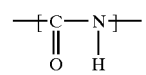

and
IV) represents a compound with none of the structural units contained in compounds (I) to (III),
wherein each of the compounds I) to IV) preferably contains at least one terminal aliphatic $C_6$–$C_{32}$-hydrocarbon radical.

Thermoplastic polymers A) which are suitable according to the invention are those of styrene, α-methylstyrene, p-methylstyrene, vinyltoluene, halogenostyrenes, methyl acrylate, methyl methacrylate, acrylonitrile, maleic anhydride, N-substituted maleimide or mixtures thereof.

The polymers A) are resinous, thermoplastic and rubber-free. Particularly preferred polymers A) are those of styrene, methyl methacrylate, styrene/acrylonitrile mixtures, styrene/acrylonitrile/methyl methacrylate mixtures, styrene/methyl methacrylate mixtures, acrylonitrile/methyl methacrylate mixtures, α-methylstyrene/acrylonitrile mixtures, styrene/α-methylstyrene/acrylonitrile mixtures, α-methylstyrene/methyl methacrylate/acrylonitrile mixtures, styrene/α-methylstyrene/methyl methacryl ate mixtures, styrene/α-methylstyrene/methyl methacrylate/acrylonitrile mixtures, styrene/maleic anhydride mixtures, methyl methacrylate/maleic anhydride mixtures and styrene/methyl methacrylate/maleic anhydride mixtures.

The polymers A) are known and can be prepared by free-radical polymerization, in particular by emulsion, suspension, solution or bulk polymerization. They preferably have molecular weights $\overline{M}_w$ of 20,000 to 200,000 or limiting viscosities [η] of 20 to 110 ml/g (measured in dimethylformamide at 25° C.).

Rubbers which are suitable for the preparation of the graft polymers B) are, in particular, polybutadiene, butadiene/styrene copolymers, butadiene/acrylonitrile copolymers, polyisoprene or alkyl acrylate rubbers based on $C_1$–$C_8$-alkyl acrylates, in particular ethyl, butyl or ethylhexyl acrylate.

The acrylate rubbers can optionally comprise up to 30 wt. % (based on the rubber weight) of copolymerized monomers, such as vinyl acetate, acrylonitrile, styrene, methyl methacrylate and/or vinyl ethers. The acrylate rubbers can also comprise a small amount, preferably up to 5 wt. % (based on the rubber weight), of polymerized-in, ethylenically unsaturated monomers having a crosslinking action. Crosslinking agents are e.g. alkylene diol diacrylates and -methacrylates, polyester diacrylates and -methacrylates, divinylbenzene, trivinylbenzene, triallyl cyanurate, allyl acrylate and methacrylate, butadiene and isoprene. The graft base can also be acrylate rubbers having a core/jacket structure with a core of crosslinked diene rubber of one or more conjugated dienes, such as polybutadiene, or a copolymer of a conjugated diene with an ethylenically unsaturated monomer, such as styrene and/or acrylonitrile.

Preferred rubbers for the preparation of graft polymers B) are diene rubbers and alkyl acrylate rubbers.

The rubbers are present in the graft polymer B) in the form of at least partly crosslinked particles of average particle diameter ($d_{50}$) of 0.05 to 20.0 μm, preferably of 0.1 to 2.0 μm, and particularly preferably of 0.1 to 0.8 μm. The average particle diameter $d_{50}$ is determined by ultracentrifuge measurements by the method of W. Scholtan et al., Kolloid-Z. u.Z. Polymere 250 (1972), 782–796.

The polymers B) can be prepared by free-radical grafting polymerization of monomers B.1) in the presence of the rubbers B.2) to be grafted onto.

Preferred preparation processes for the graft polymers B) are emulsion, solution, bulk or suspension polymerization, and combinations of these processes which are known per se. Particularly preferred graft polymers B) are ABS polymers.

Especially preferred polymers B) are products which have been obtained by free-radical polymerization of mixtures of styrene and acrylonitrile, preferably in a weight ratio of 10:1 to 1:1, particularly preferably in a weight ratio of 5:1 to 2:1, in the presence of a rubber which is built up predominantly from diene monomers (preferably polybutadiene) and has an average particle diameter ($d_{50}$) of 100 to 450 nm, especially preferably in the presence of two rubbers which have been built up predominantly from diene monomers (preferably polybutadiene) and have a) an average particle diameter ($d_{50}$) of 150 to 300 nm and b) an average particle diameter ($d_{50}$) of 350 to 450 nm, in a weight ratio of (a):(b)=10:90 to 90:10, preferably 30:70 to 60:40.

The rubber content of the polymers B) is preferably 40 to 95 wt. %, particularly preferably 50 to 90 wt. %, and especially preferably 55 to 85 wt. %.

Suitable individual components of the additive mixture C) are e.g.:

Component I): Magnesium stearate, calcium stearate, zinc stearate, magnesium montanate, calcium montanate, zinc montanate, magnesium behenate, calcium behenate, zinc behenate, magnesium oleate, calcium oleate and zinc oleate; magnesium stearate and calcium stearate are preferred and magnesium stearate is particularly preferred.

Component II): Glycerol tristearate, glycerol trioleate, glycerol tribehenate, glycerol trimontanate, stearyl stearate, stearyl oleate, stearyl behenate, stearyl montanate, oleyl stearate, oleyl oleate, oleyl behenate, oleyl montanate, behenyl stearate, behenyl oleate, behenyl behenate, behenyl montanate, octyl stearate, isooctyl stearate, dodecyl stearate, dodecyl oleate, glycerol monostearate, glycerol distearate, glycerol monooleate, glycerol dioleate, pentaerythritol tetrastearate, pentaerythritol tetraoleate, pentaerythritol tetrabehenate, pentaerythritol tetramontanate, pentaerythritol tristearate, pentaerythritol trioleate, pentaerythritol tribehenate, pentaerythritol trimontanate, pentaerythritol distearate, pentaerythritol dioleate, pentaerythritol dibehenate, pentaerythiltol dimontanate, pentaerythritol monostearate, pentaerythritol monooleate, pentaerythritol monobehenate and pentaerythritol monomontanate; glycerol tristearate, stearyl stearate and pentaerythritol tetrastearate are preferred, and glycerol tristearate and pentaerythritol tetrastearate are particularly preferred.

Component III): Ethylenediamine-bisstearylamide, erucic acid amide, oleic acid amide, stearic acid amide, behenic acid amide and montanic acid amide, ethylenediamine-bisstearylamide and erucic acid amide are preferred, and ethylenediamine-bisstearylamide is particularly preferred.

Component IV): Paraffin oils, hydrocarbon waxes, low molecular weight polystyrene prepared using $C_8$–$C_{18}$-alkylmercaptans as molecular weight regulators and with average molecular weights ($\overline{M}_w$) of between 2,000 and 15,000, preferably between 2,500 and 12,000, and particularly preferably between 3,000 and 10,000, low molecular weight styrene/acrylonitrile copolymer prepared using $C_8$–$C_{18}$-alkylmercaptans as molecular weight regulators and with average molecular weights ($\overline{M}_w$) of between 2,000 and 15,000, preferably between 2,500 and 12,000, and particularly preferably between 3,000 and 10,000, low molecular weight α-methylstyrene/acrylonitrile copolymer prepared using $C_8$–$C_{18}$-alkylmercaptans as molecular weight regulators and with average molecular weights ($\overline{M}_w$) of between 2,000 and 15,000, preferably between 2,500 and 12,000, and particularly preferably between 3,000 and 10,000, low molecular weight polymethyl methacrylate prepared using $C_8$–$C_{18}$-alkylmercaptans as molecular weight regulators and with average molecular weights ($\overline{M}_w$) of between 2,000 and 15,000, preferably between 2,500 and 12,000, and particularly preferably between 3,000 and 10,000, $C_6$–$C_{32}$-alkanols, e.g. stearyl alcohol, and $C_6$–$C_{32}$-alkenols, e.g. oleyl alcohol.

Paraffin oils, low molecular weight styrene/acrylonitrile copolymers and α-methylstyrene/acrylonitrile copolymers are preferred, and paraffin oils and low molecular weight styrene/acrylonitrile copolymers are particularly preferred.

Preferably, all components I), II), III) and IV) have a molecular weight above 300, preferably above 400, and particularly preferably above 500.

The ratios of amounts in the use according to the invention of at least 3 components chosen from components I), II), III) and IV) are preferably chosen such that the relationship $$(I) \leq (IV) < (II) \leq (III)$$

or the relationship $$(I) \leq (IV) < (III) \leq (II)$$

applies.

Particularly preferred mixtures comprise 15 to 65 wt. % graft polymer of 25 to 60 parts by wt. styrene, α-methylstyrene, acrylonitrile, N-phenylmaleimide or mixtures thereof on 75 to 40 parts by wt. polybutadiene, 85 to 35 wt. % thermoplastic copolymer of 5 to 40 parts by wt. acrylonitrile and 95 to 60 parts by wt. styrene, α-methylstyrene, N-phenylmaleimide or mixtures thereof and 1 to 5 parts by wt. per 100 parts by wt. of A+B of a combination of at least 3 components chosen from I) magnesium stearate, II) glycerol stearate or pentaerythritol tetrastearate, III) ethylenediamine-bisstearylanmide and IV) paraffin oil or low molecular weight styrene/acrylonitrile copolymer.

The mixtures according to the invention comprising A), B) and C) and optionally conventional additives, such as processing agents, stabilizers, pigments, antistatics and fillers, are prepared by mixing the particular constituents in a known manner simultaneously or successively at room temperature or at a higher temperature and then subjecting the mixture to melt compounding or melt extrusion at temperatures of 150° C. to 300° C. in conventional units, such as internal kneaders, extruders or twin-screw extruders.

The moulding compositions of the present invention can be used for the production of any type of shaped articles, it being possible to use conventional production methods, and in particular shaped articles can be produced by injection moulding.

Another form of processing the moulding compositions according to the invention is the production of shaped articles by thermoforming from sheets or films produced beforehand by known processes.

EXAMPLES

Thermoplastic Resin A1

Random styrene/acrylonitrile=72:28 (weight ratio) copolymer with an $\overline{M}_w$ of approx. 85,000, determined by GPC (gel permeation chromatography).

Thermoplastic Resin A2

Random α-methylstyrene/acrylonitrile=72:28 (weight ratio) copolymer with an $\overline{M}_w$ of approx. 75,000, determined by GPC.

Graft Polymer B1

Graft product obtained by emulsion polymerization of 42 wt. % of a styrene/acrylonitrile mixture (weight ratio 73:27) on 58 wt. % of a 1:1 mixture (weight ratio) of two particulate polybutadienes with a) an average particle diameter ($d_{50}$) of 290 nm and b) an average particle diameter ($d_{50}$) of 420 nm. Working up by coagulation of the latex with magnesium sulphate, washing with water and subsequent drying in vacuo.

Graft Polymer B2

Graft product obtained by emulsion polymerization of 50 wt. % of a styrene/acrylonitrile mixture (weight ratio 73:27) on 50 wt. % particulate polybutadiene with an average particle diameter ($d_{50}$) of 130 nm. Working up as under B1.

Additive CI1: Magnesium stearate
(Bärlocher, Munich, Germany)

Additive CI2: Calcium stearate
(Bärlocher, Munich, Germany)

Additive CII1: Pentaerythritol tetrastearate
(Henkel, Düsseldorf, Germany)

Additive CII2: Stearyl stearate
(Henkel, Düsseldorf, Germany)

Additive CIII1: Ethylenediarnine-bisstearylamide
(Henkel, Düsseldorf, Germany)

Additive CIV1: Paraffin oil (Ondina G34)
(Deutsche Shell AG, Hamburg)

Additive CIV2: Low molecular weight styrene/acrylonitrile copolymer ($\overline{M}_w$ 4,200, determined by GPC), prepared by free-radical emulsion polymerization of a mixture of 63.9 parts by wt. styrene, 23.6 parts by wt. acrylonitrile and 12.5 parts by wt. tert-dodecylmercaptan.

The individual components are compounded in the contents by weight stated in table 1 on a 1.3 l internal kneader at temperatures of 160° C. to 200° C. The shaped articles were produced on an injection moulding machine at 240° C.

The notched impact strength was determined at room temperature ($a_k^{RT}$) and at –30° C. ($a_k^{-30°\ C.}$) in accordance with ISO 180/1A (unit: $kJ/m^2$), and the thermoplastic flowability was evaluated by measuring the melt flow index (MVR) in accordance with DIN 53 735 U (unit: $cm^3/10$ min).

As can also be seen from table 1, a very good combination of high toughness and good thermoplastic processability is achieved only when the mixtures according to the invention are employed.

TABLE 1

Compositions and test data of the moulding compositions

| Example no. | A1 parts by wt. | A2 parts by wt. | B1 parts by wt. | B2 parts by wt. | CI1 parts by wt. | CI2 parts by wt. | CII1 parts by wt. | CII2 parts by wt. | CIII1 parts by wt. | CIV1 parts by wt. | CIV2 parts by wt. | $a_k^{RT}$ (kJ/m²) | $a_k^{-30°\ C.}$ (kJ/m²) | MVR (cm³/10 min) |
|---|---|---|---|---|---|---|---|---|---|---|---|---|---|---|
| 1 | 70 | — | 30 | — | — | — | 2 | — | 1 | — | 0.5 | 16.5 | 9.3 | 27.2 |
| 2 | 70 | — | 30 | — | — | — | 1 | — | 2 | — | 0.5 | 17.0 | 9.2 | 28.5 |
| 3 | 70 | — | 30 | — | 0.5 | — | 2 | — | — | — | 0.5 | 17.6 | 9.1 | 24.5 |
| 4 | 70 | — | 30 | — | 0.5 | — | 2 | — | 1 | — | 0.5 | 16.8 | 9.1 | 27.3 |
| 5 | 70 | — | 30 | — | — | 0.5 | 1 | — | 2 | — | 0.5 | 17.4 | 9.4 | 27.6 |
| 6 | 70 | — | 30 | — | 0.5 | — | — | — | 2 | 0.8 | — | 17.9 | 9.5 | 27.6 |
| 7 (comp.) | 70 | — | 30 | — | — | — | — | — | — | — | — | 7.8 | n.d. | 23.2 |
| 8 (comp.) | 70 | — | 30 | — | — | — | — | — | — | — | 0.5 | 7.5 | n.d. | 20.5 |
| 9 (comp.) | 70 | — | 30 | — | — | — | 2 | — | — | — | — | 13.9 | 8.9 | 23.7 |
| 10 (comp.) | 70 | — | 30 | — | — | — | — | — | 1 | — | 0.5 | 13.0 | 7.4 | 28.7 |
| 11 (comp.) | 70 | — | 30 | — | 0.5 | — | — | — | — | — | 0.5 | 11.8 | 6.5 | 24.1 |
| 12 (comp.) | 70 | — | 30 | — | — | — | 2 | — | — | — | — | 15.6 | 8.9 | 22.3 |
| 13 (comp.) | 70 | — | 30 | — | — | — | — | — | 1 | — | — | 14.8 | 8.1 | 22.4 |
| 14 (comp.) | 70 | — | 30 | — | 0.5 | — | — | — | — | — | — | 11.8 | 6.8 | 23.9 |
| 15 | — | 75 | 12.5 | 12.5 | — | — | 2 | — | 1 | — | 0.5 | 16.7 | 7.8 | 5.5 |
| 16 | — | 75 | 12.5 | 12.5 | — | — | — | 2 | 1 | — | 0.5 | 17.1 | 8.0 | 5.7 |
| 17 | — | 75 | 12.5 | 12.5 | 0.5 | — | 2 | — | — | — | 0.5 | 17.6 | 7.5 | 4.5 |
| 18 | — | 75 | 12.5 | 12.5 | 0.5 | — | 2 | — | 1 | — | 0.5 | 18.4 | 7.7 | 5.3 |
| 19 | — | 75 | 12.5 | 12.5 | — | 0.5 | 2 | — | 1 | — | 0.5 | 19.0 | 7.9 | 5.5 |
| 20 (comp.) | — | 75 | 12.5 | 12.5 | — | — | — | — | — | — | — | 10.3 | 6.8 | 4.9 |
| 21 (comp.) | — | 75 | 12.5 | 12.5 | — | — | — | — | — | — | 0.5 | 6.7 | n.d. | 4.9 |
| 22 (comp.) | — | 75 | 12.5 | 12.5 | — | — | 2 | — | — | — | 0.5 | 14.4 | 7.9 | 4.6 |
| 23 (comp.) | — | 75 | 12.5 | 12.5 | — | — | — | — | 1 | — | 0.5 | 12.1 | 6.7 | 5.8 |
| 24 (comp.) | — | 75 | 12.5 | 12.5 | 0.5 | — | — | — | — | — | 0.5 | 10.9 | 6.3 | 4.5 |
| 25 (comp.) | — | 75 | 12.5 | 12.5 | — | — | 2 | — | — | — | — | 13.8 | 7.7 | 4.3 |
| 26 (comp.) | — | 75 | 12.5 | 12.5 | — | — | — | — | 1 | — | — | 11.9 | 7.1 | 5.3 |
| 27 (comp.) | — | 75 | 12.5 | 12.5 | 0.5 | — | — | — | — | — | — | 11.5 | 6.9 | 4.1 | n.d. = not determined

What is claimed is:

1. A thermoplastic molding composition comprising
   A) 5 to 95 wt. % of one or more thermoplastic (co)polymers of a member selected from the group consisting of styrene, α-methylstyrene, vinyltoluene, halogen styrenes, methyl methacrylate, acrylonitrile, methacrylonitrile, maleic anhydride and N-phenyl maleimide,
   B) 5 to 95 wt. % of one or more graft polymers of
      B.1) 5 to 90 parts by wt. of at least one member selected from the group consisting of styrene, α-methylstyrene, styrene substituted on the nucleus, methyl methacrylate, acrylonitrile, methacrylonitrile, maleic anhydride and N-substituted maleimide on
      B.2) 95 to 10 parts by wt. of at least one rubber having a glass transition temperature equal to or lower than 10° C.,
   and
   C) 0.1 to 8 parts by wt. (per 100 parts by wt. of A+B) of a combination of at least 3 components chosen from compounds I), II), III) and IV), where IV) is a compound having at least one structural unit conforming to

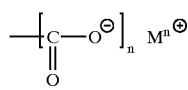

where M=a metal, and n=the valence of the metal M, and
   II) is a compound having at least one structural unit conforming to

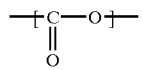

and
   III) is a compound having at least one structural unit conforming to

and
   IV) is a compound that is different than compounds (I), (II) and (III) and is a member selected from the group consisting of paraffin oils, hydrocarbon waxes, polystyrene prepared using $C_8$–$C_{18}$-alkylmercaptans as molecular weight regulators and having weight average molecular weights of 2,000 to 15,000, styrene/acrylonitrile copolymer prepared using $C_8$–$C_{18}$-alkylmercaptans as molecular weight regulators and having weight average molecular weights of 2,000 to 15,000, α-methylstyrene/acrylonitrile copolymer prepared using $C_8$–$C_{18}$-alkylmercaptans as molecular weight regulators and having weight average molecular weights of 2,000 to 15,000, poly(methyl methacrylate) prepared using $C_8$–$C_{18}$-alkylmercaptans as molecular weight regulators and having weight average molecular weights of 2,000 to 15,000, $C_6$–$C_{32}$-alkanols and $C_6$–$C_{32}$-alkenols,
   wherein the relative amounts of (I), (II), (III) and (IV) are,
   (I)<(IV)<(II)<(III) or
   (I)<(IV)<(III)<(II).

2. The composition according to claim 1 wherein each of compounds (I), (II), (III) and (IV) contains at least one terminal $C_6$–$C_{12}$-hydrocarbon radical.

3. The composition according to claim 1 wherein compound (I) is a member selected from the group consisting of magnesium stearate, calcium stearate, zinc stearate, magnesium montanate, calcium montanate, zinc montanate, magnesium behenate, calcium behenate, zinc behenate, magnesium oleate, calcium oleate and zinc oleate.

4. The composition according to claim 1 wherein compound (II) is a member selected from the group consisting of glycerol tristearate, glycerol trioleate, glycerol tribehenate, glycerol trimontanate, stearyl stearate, stearyl oleate, stearyl behenate, stearyl montanate, oleyl stearate, oleyl oleate, oleyl behenate, oleyl montanate, behenyl stearate, behenyl oleate, behenyl behenate, behenyl montanate, octyl stearate, isooctyl stearate, dodecyl stearate, dodecyl oleate, glycerol monostearate, glycerol distearate, glycerol monooleate, glycerol dioleate, pentaerythritol tetrastearate, pentaerythritol tetraoleate, pentaerythritol tetrabehenate, pentaerythritol tetramontanate, pentaerythritol tristearate, pentaerythritol trioleate, pentaerythritol tribehenate, pentaerythritol trimontanate, pentaerythritol distearate, pentaerythritol dioleate, pentaerythritol dibehenate, pentaerythritol dimontanate, pentaerythritol monostearate, pentaerythritol monooleate, pentaerythritol monobehenate and pentaerythritol monomontanate.

5. The composition according to claim 1 wherein compound (III) is a member selected from the group consisting of ethylenediamine-bissstearylamide, ethylenediamine-erucic acid amide, ethylenediamine-oleic acid amide, ethylenediamine-stearic acid amide, ethylenediamine-behenic acid amide and ethylenediamine-montanic acid amide.

6. The composition according to claim 1 wherein Compound (I) is a member selected from the group consisting of magnesium stearate and calcium stearate,
   Compound (II) is a member selected from the group consisting of glycerol stearate, stearyl stearate and pentaerythritol tetrastearate,
   Compound (III) is a member selected from the group consisting of ethylenediaminebissstearylamide and erucic acid amide, and
   Compound (IV) is a member selected from the group consisting of paraffin oils, low molecular weight styrene/acrylonitrile copolymers and α-methylstyrene/acrylonitrile copolymers.

7. The composition according to claim 1 wherein said B.2 is a member selected from the group consisting of diene rubbers and alkyl acrylate rubbers.

8. The composition according to claim 1 wherein C) is present in an amount of 1 to 5 parts per 100 parts by weight of A+B.

9. The composition of claim 1 wherein (C) comprises compound (II) and at least two compounds selected from (I), (III) and (IV).

10. The composition of claim 9 wherein,
    compound (C)(I) is magnesium stearate,
    compound (C)(II) is at least one of glycerol stearate and pentaerythritol tetrastearate,
    compound (C)(III) is ethylenediamine-bissstearylamide, and
    compound (C)(IV) is at least one of paraffin oil and low molecular weight styrene/acrylonitrile copolymer.

11. The composition of claim 1 wherein,
    compound (C)(I) is magnesium stearate, compound (C)(II) is at least one of glycerol stearate and pentaerythritol tetrastearate, compound (C)(III) is ethylenediamine-bisstearylamide, and compound (C)(IV) is at least one of paraffin oil and low molecular weight styrene/acrylonitrile copolymer.

12. The composition according to claim 1 further containing at least one member selected from the group consisting of processing auxiliaries, stabilizers, pigments, antistatic agents and fillers.

13. A method of using the composition according to claim 1 comprising production a molded article.

14. A molded article comprising the molding composition of claim 1.

* * * * *